United States Patent
Kurihara et al.

(10) Patent No.: US 7,043,556 B2
(45) Date of Patent: May 9, 2006

(54) CONTENT DELIVERING METHOD

(75) Inventors: Junichi Kurihara, Kanagawa (JP); Tatsuya Akashi, Tokyo (JP); Junko Ozaki, Kanagawa (JP); Mika Munenaka, Tokyo (JP)

(73) Assignee: Sony Corporation, Tokyo (JP)

( * ) Notice: Subject to any disclaimer, the term of this patent is extended or adjusted under 35 U.S.C. 154(b) by 850 days.

(21) Appl. No.: 09/858,043

(22) Filed: May 15, 2001

(65) Prior Publication Data

US 2002/0023167 A1 Feb. 21, 2002

(30) Foreign Application Priority Data

May 15, 2000 (JP) .......................... P2000-141761

(51) Int. Cl.
*G06F 15/16* (2006.01)

(52) U.S. Cl. ..................................... 709/231; 709/206

(58) Field of Classification Search ................ 709/206, 709/201–253; 370/464–469; 715/752
See application file for complete search history.

(56) References Cited

U.S. PATENT DOCUMENTS

| 5,774,664 | A | 6/1998 | Hidary et al. |
| 6,219,694 | B1 * | 4/2001 | Lazaridis et al. ........... 709/206 |

FOREIGN PATENT DOCUMENTS

| GB | 2302635 A | 1/1997 |
| WO | WO 99/37045 | 7/1999 |

* cited by examiner

*Primary Examiner*—David Wiley
*Assistant Examiner*—Arrienne M. Lezak
(74) *Attorney, Agent, or Firm*—Bell, Boyd, & Lloyd LLC

(57) ABSTRACT

A content delivering method for transmitting a content file from a server to a user terminal unit through a network and causing the user terminal unit to stream-reproduce the content file is disclosed. The method includes designating a non-skip area that represents an important portion of a content file. The method further includes transmitting information from the non-skip area from the server to the user terminal unit along with the content file. According to the inventive method, the user terminal unit is caused to determine whether or not the non-skip area has been skipped and when the non-skip area has been skipped, transmits information that indicates that the non-skip area has been skipped to the server. Finally, the method includes causing the server to transmit information corresponding to the non-skip area to the user by another transmitting means when the server has received the information that indicates that the non-skip area has been skipped.

1 Claim, 4 Drawing Sheets

Fig. 2

| FILE NAME | REGISTERED DATE AND TIME | GENRE | FILE SIZE | FILE FORMAT | FEE | TITLE OF CONTENT |
|---|---|---|---|---|---|---|
| news19 | 10/19 | news | 40 | MPEG1 | 0 | NCV 15 O'CLOCK NEWS, DATED ON 10/19 |
| news21 | 10/21 | news | 40 | MPEG1 | 0 | NCV 15 O'CLOCK NEWS, DATED ON 10/21 |
| anime45 | 10/19 | anime | 80 | MPEG1 | 300 | ADVENTURE TRACK STORY 2, DATED ON 10/7 |
| sport18 | 10/18 | sport | 40 | MPEG1 | 100 | SPORTS TODAY, DATED ON 10/18 |
| ... | ... | ... | ... | ... | ... | ... |

Fig. 3

| USER ID | TOTAL CAPACITY | USED CAPACITY | NON-USED CAPACITY | RECORD CAPACITY ALLOCATED AREA |
|---|---|---|---|---|
| 001 | 1000 | 800 | 200 | C1-C7 |
| 002 | 1000 | 1000 | 0 | C8-CE |
| 003 | 4000 | 2820 | 1180 | CF-EC |

Fig. 4

| USER ID | STORAGE FILE | GENRE | FILE SIZE | RECORD AREA | AUTOMATIC DELETE |
|---|---|---|---|---|---|
| 001 | news5 | news | 40 | C1 | YES |
| 001 | news6 | news | 40 | C1 | YES |
| 001 | anime8 | anime | 80 | C2 | NO |
| 001 | news8 | news | 40 | C2 | YES |

Fig. 5

| USER ID | FILE NAME | REQUESTED DATE AND TIME | CAPACITY | GENRE | TRANSFERRED DATE |
|---|---|---|---|---|---|
| 001 | news8 | 10/2 | 40 | news | 10/8 |
| 001 | anime45 | 10/7 | 80 | anime | 10/7 |
| 001 | news21 | 10/21 | 40 | news | |

Fig. 6

| FILE ID | NON-SKIP AREA | INFORMATION PROVIDER ID |
|---|---|---|
| News23 | 5002-5932 | 2335 |
| News23 | 12332-28901 | 1423 |
| News44 | 132-4432 | 1343 |

Fig. 7

| INFORMATION PROVIDER ID | FILE ID | NON-SKIP AREA | DELIVERY FILE |
|---|---|---|---|
| 2335 | News23 | 5002-5932 | CM52.doc |
| 1423 | News23 | 12332-28901 | Cmdrink.doc |
| 1423 | anime-xt | 3404-5225 | Info-car2.doc |

CONTENT DELIVERING METHOD

BACKGROUND OF THE INVENTION

1. Field of the Invention

The present invention relates to a content delivering method suitable for delivering stream-reproducing content files such as moving picture, still picture, and music program files delivered from a server to a user terminal unit.

2. Description of the Prior Art

A service that provides content files containing moving pictures, still pictures, music programs, and so forth through a network is becoming attractive. In such a conventional content delivering service, when a user purchases content, he or she accesses a particular server that delivers the content through a user terminal unit and downloads a file containing the desired content through the network.

In recent years, servers that deliver content such as moving pictures, still pictures, music programs, and so forth have been used on a network. When such a service is used, a user terminal unit is connected to a server that delivers content through the network. When the user terminal unit is connected to such a server, the names of various content and data about the various content that the server provides are displayed. When the user purchases particular content, the user terminal unit transmits a download request for the desired content to the server.

When the server receives the download request for the desired content, the server retrieves the file of the desired content from a predetermined library and transfers the retrieved file to the user terminal unit through the network. The file containing the content is stored to a hard disk drive or the like of the user terminal unit. Alternatively, the user terminal unit may reproduce a content file transmitted from the server on a real time basis (this operation is referred to as streaming reproducing operation).

When the user receives content through the network, he or she can operate the user terminal unit so as to perform various reproducing functions such as stop operation, forward skipping operation and backward skipping operation. However, this allows the user to selectively view various portions of the content. Thus, the user may skip over messages or commercials that are an important portion of the content from view point of the information provider. Thus, the information provider suffers from the availability of such functions.

OBJECTS AND SUMMARY OF THE INVENTION

Therefore, an object of the present invention is to provide a content delivering method that allows an important portion of the content to be securely delivered when content files containing content such as moving pictures, still pictures, and music programs are delivered from a server to a user terminal unit and stream-reproduced by the user terminal unit.

The present invention is a content delivering method for transmitting a content file from a server to a user terminal unit through a network and causing the user terminal unit to stream-reproduce the content file. The method includes designating a non-skip area that represents an important portion of the content file being delivered. Information regarding the non-skip area is transmitted from the server to the user terminal unit along with the content file. The user terminal unit is configured to determine whether or not the non-skip area has been skipped. When the user terminal unit determines that the non-skip area has indeed been skipped, it transmits information to the server representing that the non-skip area has been skipped. The method further includes causing the server to transmit information corresponding to the non-skip area to the user by another transmitting means when the server has received the information that the non-skip area has been skipped.

Thus, when a content file is transmitted from a server to a user terminal unit, information of a non-skip area is also transmitted. The user terminal unit determines whether or not the non-skip area has been skipped. When the non-skip area has been skipped, information representing that the non-skip area has been skipped is transmitted to the server. When the server receives such information, information corresponding to the non-skip area is transmitted to the user terminal unit using another transmission means such as electronic mail. Thus, even if the important information is skipped by the user at the user terminal unit, the information can be securely delivered to the user by other channels.

These and other objects, features and advantages of the present invention will become apparent in light of the following detailed description of a preferred embodiment of the invention, as illustrated in the accompanying drawings.

BRIEF DESCRIPTION OF DRAWINGS

FIG. 2 is a schematic diagram for explaining the content managing system according to the present invention;

FIG. 3 is a schematic diagram for explaining the content managing system according to the present invention;

FIG. 4 is a schematic diagram for explaining the content managing system according to the present invention;

FIG. 5 is a schematic diagram for explaining the content managing system according to the present invention;

FIG. 6 is a schematic diagram for explaining a non-skip area in the content managing system according to the present invention; and FIG. 7 is a schematic diagram for explaining a non-skip area in the content managing system according to the present invention.

DETAILED DESCRIPTION OF THE PREFERRED EMBODIMENT

Figure 1:
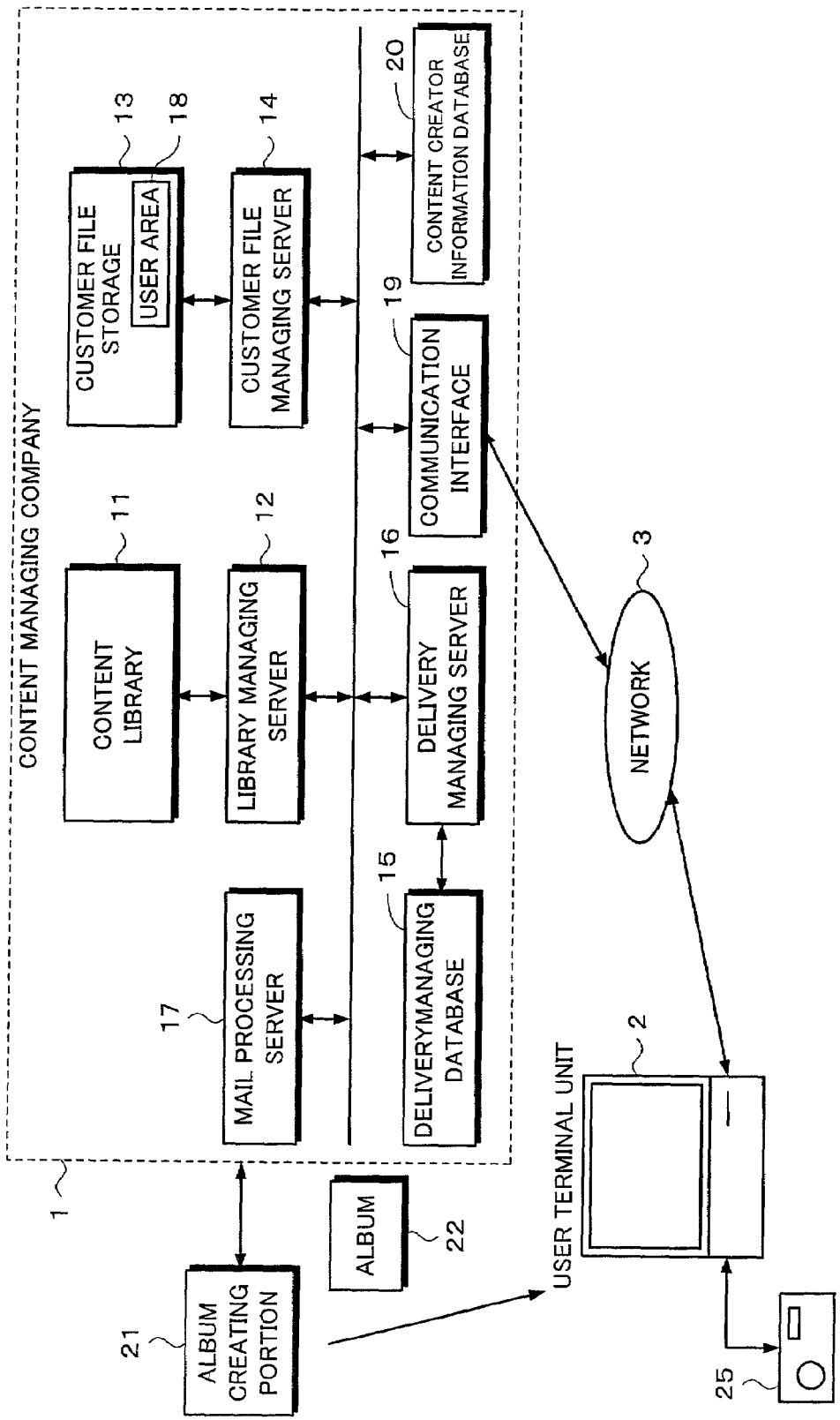
FIG. 1 is a block diagram showing the overall structure of a content managing system according to the present invention.

Next, with reference to the accompanying drawings, an embodiment of the present invention will be described. FIG. 1 shows an example of the structure of a system according to the present invention. In FIG. 1, reference numeral 1 is a content managing company. The content managing company 1 totally manages content data of moving pictures such as movies and dramas, content data of still pictures, content data of music programs, and so forth. In addition, the content managing company 1 provides a service for storing the content of users and a service in association therewith as well as a service for selling and providing contents.

The content managing company 1 has a content library 11, a library managing server 12, a customer file storage 13, a customer file managing server 14, a delivery managing database 15, and a delivery managing server 16. The content library 11 stores various content that the content managing company 1 provides and sells. The library managing server 12 manages the content library 11. The customer file storage 13 stores the content of users. The customer file managing server 14 manages the customer file storage 13. The delivery managing database 15 stores delivery information. The delivery managing server 16 manages the delivery of content. In addition, the content managing company 1 has a mail processing server 17. The mail processing server 17 exchanges message with customers.

These servers 12, 14, 16, and 17 are connected to a network so that data are exchanged therebetween. In addition, these severs 12, 14, 16, and 17 can be connected to the network 3 through a communication interface 19. The network 3 is for example the Internet.

These servers 12, 14, 16, and 17 may be provided by dedicated computers, respectively. Alternatively, the servers 12, 14, 16, and 17 may be provided by a single computer. The content library 11, the customer file storage 13, and the customer database 15 may be provided by a storage device of a server or by dedicated computers. In addition, these servers 12, 14, 16, and 17 and the content library 11, the customer file storage 13, and the customer database 15 may be managed by different companies rather than the same company.

A user terminal unit 2 is a terminal unit that each user operates. The user terminal unit 2 can be provided by a personal computer. The user terminal unit 2 has a communicating function. The user terminal unit 2 can be connected to the network 3. The user terminal unit 2 may be connected to the network 3 through a telephone line, a network service of a CATV (Cable Television), a network service of a cellular phone, a dedicated line, or the like.

The content library 11 has a storage device having a large storage capacity so that it can store large amounts of different content data that the content managing company 1 provides and sells. As shown in FIG. 2, the various content is stored in files. Each content file stored in the content library 11 is managed with "file name", "registered date and time", "genre", "file size", "file format", "fee", and "title of content".

The "file name" is a uniquely designated name of each content file so as to identify it. The "registered date and time" is the date and time a which each content file will be registered or was registered. The "title of content" is a field that represents the title of each content file. The "title of content" may contain a still picture of a typical scene, a moving picture thereof, an audio guide, or the like. The "genre" is information as to how each content file is categorized. The "file size" is the size of each content file. The "file size" is normally a value expressed as bytes. Alternatively, the "file size" may be a special parameter corresponding to each file format. For example, in the case of a moving picture, the "file size" may be a value expressed as the reproduction time of the moving picture. The "file format" is information that represents the format of each content file. The "fee" is the fee necessary for purchasing each content file. The "fee" may contain copyright information.

The library managing server 12 manages the content library 11. When another device on the network transmits a content request to the library managing server 12, it searches the content library 11 for the requested content file and transfers the retrieved content file to the device. In other words, the library managing server 12 has a searching function. When the library managing server 12 receives a keyword, the library managing server 12 searches the content library 11 for a content file that contains the keyword and outputs the searched result. In addition, the library managing server 12 can output the searched result corresponding to the file name, the registered date and time, the genre, the file size, the fee, and the title of the content.

In addition to content files stored in the content library 11, the library managing server 12 manages content files that are scheduled to be delivered later. Corresponding to a request received from an external device, the library managing server 12 can provide information about content files that are scheduled to be delivered later and output the searched result. When the library managing server 12 receives a content file that will be newly delivered, the library managing server 12 registers the content file to the content library 11.

The customer file storage 13 provides a user area 18 that a user who made a contract with the content managing company 1 can use for storing content. As shown in FIG. 3, the customer file storage 13 assigns a record capacity to each user. Each user is managed with a unique user ID. The total capacity for each user is designated corresponding to a contract that each user made with the content managing company 1. Corresponding to the contract, the total capacity is designated and assigned as the user area 18 for each user. Each user can freely use the assigned user area 18 of the customer file storage 13 in the range of the contracted capacity in the period corresponding to the contract. In other words, each user can store a new content file to the user area 18, delete a content file from the user area 18, move a content file in the user area 18, and download a content file stored in the user area 18 to the user terminal unit 2. The user can store his or her own content files to the user area 18.

When the content managing company 1 makes a contract with each user, the content managing company 1 will charge the user corresponding to the size of the user area 18. Of course, the content managing company 1 can change the size of the user area 18 later.

Each user can purchase content data stored in the content library 11 and content files that are scheduled to be delivered later. The user can store the purchased content file to the user area 18 of the customer file storage 13. In addition, the user can store a content file that he or she created to the user area 18 of the customer file storage 13.

The customer file managing server 14 manages content files stored in the user area 18 for each user of the customer file storage 13 using a database shown in FIG. 4. The customer file managing server 14 can perform for example, a file searching process, a file transferring process, a file deleting process, and so forth. The file managing server 14 prohibits each user from accessing the user area 18 assigned to another user.

As shown in FIG. 4, each user is managed with a unique user ID. Each content file stored by each user is managed with the user ID, the file name, the genre, the file size, and the storage record area. An automatic delete option is added to each content file. When the automatic delete option is added to a content file, the content file is deleted when the capacity of the user area 18 runs out and can no longer store new content files. Moreover, the customer file managing server 14 performs a record capacity increasing/decreasing process for the user area corresponding to a changed contract, a contract period managing process, and so forth.

The delivery managing server 16 manages the delivery of content data. When the delivery managing server 16 receives a content purchase request from a user, the delivery managing server 16 creates delivery management information for each user in the delivery managing database 15. As shown in FIG. 5, the delivery managing database 15 is managed with the user ID, the file name, the requested date and time, the scheduled file registration date and time, the capacity, the genre, and the file transferred date.

When a user purchases content, a file purchase request command is transmitted from the user terminal unit 2 to the delivery managing server 16 through the network 3. Corresponding to the purchase request, delivery management information for each user is created in the delivery managing database 15.

The delivery managing server 16 sends a copy command to the library managing server 12 for copying the content file to the user area 18 for the user. The library managing server 12 searches the content library 11 for a file containing the desired content. When the content library 11 contains the file, the library managing server 12 retrieves the file from the content library 11, and sends the retrieved file to the customer file managing server 14. The customer file managing server 14 copies the file to the user area 18 of the customer file storage 13.

Thus, the content purchasing process can be accomplished as a copying process for copying a file from the content library 11 to the user area 18 of the customer file storage 13. Since the amount of data contained in a content file containing a moving picture is large, it takes a long time to transfer the file. In contrast, according to such a system, since the content file is copied between servers on the same network, the content purchasing process can be quickly completed. In addition, a situation in which the download of the content file fails does not take place.

A user can access his or her assigned user area 18 through the user terminal unit 2. As was described above, a content file that a user purchased is stored in the user area 18. The user can access the user area 18 and download it to the user terminal unit 2 or reproduce it on a real time basis (as the streaming reproducing operation).

As described above, a user area for storing content is assigned to each user who enters a contract with the content managing company 1. Each user can use a content purchase service or other services within the user area.

Next, services provided by the content managing company 1 will be described.

The user terminal unit 2 has a communicating function for connecting it to the network 3. A browser that allows the user to browse web pages is installed to the user terminal unit 2. When the user uses a service provided by the content managing company 1, he or she makes a contract with the content managing company 1. After the user has entered a contract with the content managing company 1, it assigns a user ID and a password to the user.

When a user who has entered a contract with the content managing company 1 wants to use the services of the content managing company 1, he or she connects the user terminal unit 2 to the network 3, starts up the browser, and accesses the URL (Uniform Resource Locator) of the content managing company 1. When the user terminal unit 2 accesses the URL of the content managing company 1, it transmits an authentication page to the user terminal unit 2.

The authentication page contains a user ID input box and a password input box. The user inputs the user ID and the password assigned by the content managing company 1 to those boxes and then clicks a login button.

When the user inputs the user ID and the password to those boxes and then clicks the login button, the content managing company 1 performs an authenticating process for determining whether or not the accessed user is a user who made a contract with the content managing company 1. When the content managing company 1 has authenticated the user as a valid user, the content managing company 1 transmits a user home page to the user terminal unit 2.

The user home page is a home page that is dedicated for each user and that is necessary for using the services of the content managing company 1. The user home page displays the user ID of the user, the total capacity of the user's user area, the used capacity, and so forth. In addition, the user home page displays an input for checking the used state of the user area of the user, an input for purchasing content, and an input for using various services.

When the user checks for the used state of the user area 18, he or she clicks a predetermined area on the home page. At a result, a user area used state request command is transmitted from the user terminal unit 2. The user area used state request command is transmitted to the customer file managing server 14 through the network 3.

When the customer file managing server 14 receives the user area used state request command, the customer file managing server 14 checks for the used state of the user area 18 corresponding to the user ID of the user. With the managing database shown in FIG. 4, the customer file managing server 14 checks for the used state of the user area 18 for the user and transmits a user stored content list page to the user terminal unit 2. The user can view the used state of the user area 18 on the user stored content list page.

The user can download a content file stored in the user area 18 or reproduce the contents of the content file on a real time basis (as the streaming reproducing operation).

When the user reproduces a content file stored in the user area 18 on a real time basis (as the streaming reproducing operation), he or she designates the name of the content file, then clicks a predetermined button. As a result, a streaming reproduction request command for the file is transmitted from the user terminal unit 2. The streaming reproduction request command for the file is transmitted to the customer file managing server 14 through the network 3.

When the customer file managing server 14 receives the streaming reproduction request command from the user terminal unit 2, the customer file managing server 14 retrieves the designated file from the user area 18 and transfers the data of the file to the user terminal unit 2 for the streaming reproducing operation. At that point, the user terminal unit 2 starts up an application for the streaming reproducing operation for the moving picture contained in the file. When the customer file managing server 14 transmits the data from the file to the user terminal unit 2, the application for the streaming reproducing operation reproduces the content corresponding to the transmitted data.

When the user stores the content file, he or she designates the file and clicks a predetermined button. As a result, a file transfer request command is transmitted from the user terminal unit 2. The file transfer request command is transmitted to the customer file managing server 14 through the network 3.

When the customer file managing server 14 receives the file transfer request command, the customer file managing server 14 retrieves the designated file from the user area 18 and transfers the retrieved file to the user terminal unit 2. The content file transferred from the customer file managing server 14 is stored to the hard disk drive or other storage device of the user terminal unit 2.

When the user purchases content, he or she inputs the file name of the content to a redetermined box of the purchase page. The file name may be selected from a box that contains a plurality of file names. Alternatively, contents may be narrowed down corresponding to the searched result so that the user can select a file name from the narrowed result. When the user inputs the file name and clicks the purchase button, a file purchase request command is transmitted from the user terminal unit 2. The file purchase request command is transmitted to the delivery managing server 16 through the network 3.

When the delivery managing server 16 receives the file purchase request command, the delivery managing server 16 registers the file purchased state to the delivery managing database shown in FIG. 5 and transmits a copy command for copying the file to the user area 18 for the user to the library managing server 12.

When the library managing server 12 receives the copy command, the library managing server 12 searches the content library 11 for the file. When the content library 11 contains the file, the library managing server 12 retrieves the file from the content library 11 and copies the file to the designated user area 18 of the customer file storage 13. As a result, the content purchasing process is completed.

When the requested file is scheduled to be delivered later, the library managing server 12 notifies the delivery managing server 16 of the scheduled delivery date. On the scheduled delivery date, the delivery managing server 16 sends a copy command for copying the file to the user area 18 for the user to the library managing server 12. When the library managing server 12 receives the copy command, the library managing server 12 searches the content library 11 for the file. When the content library 11 contains the file, the library managing server 12 retrieves the file from the content library 11 and copies the file to the designated user area 18 of the customer file storage 13. As a result, the content purchasing process is completed.

After the content file of the content corresponding to the purchase request has been copied from the library to the user area 18 of the user, and the content purchasing process has been completed, a charging process is performed for the fee associated with the purchase of the content.

Thus, as has been described, the system includes a user area 18 in which the system can manage content. Content files stored in the user area 18 can be transmitted to and stream-reproduced by the user terminal unit 2 or content files can be down-loaded to the hard disk drive of the user terminal unit 2.

In such a system, when a content file is transmitted from the user area 18 or the content library 11 to the user terminal unit 2 and stream-reproduced by the user terminal unit 2, the user can operate the user terminal unit so as to perform various reproducing functions such as stop operation, forward skipping operation and backward skipping operation. However, in doing so, the user may skip an important message or a commercial that the information provider desires the user to see.

Thus, in this example, a content file has a non-skip area that represents an important portion of the content that the information provider wants the user to see. When the non-skip area is skipped, information corresponding to the non-skip area is transmitted to the user terminal unit using another transmission channel such as electronic mail. Thus, the information provider is ensured that the important information has been securely delivered to the user.

In other words, as shown in FIG. 6, the content library 11 stores information of a non-skip area for a content file. The information of the non-skip area is managed with a database. After specific content is purchased and a content file is copied to the user area 18, the information of the non-skip area is not removed from the database. The information of the non-skip area can be searched from the database corresponding to a search request issued from the delivery managing server 17.

In addition, the content library 11 has a content creator information database 20. As shown in FIG. 7, the content creator information database 20 stores information associated with non-skip areas of content files for each content information provider. In FIG. 7, "delivery file" represents a file of information that is delivered in the case that a non-skip area has been skipped. For example, when a non-skip area is a commercial, the delivery file contains the information from the commercial.

When the delivery managing server 17 issues a search request for a non-skip area of a content file, the information from the content creator information database 20 is provided to the user using another means such as electronic mail.

For example, when a content file is transmitted from the content library 11 to the user terminal unit 2 and the content file is stream-reproduced, a steaming delivery request is transmitted from the user terminal unit 2 to the delivery managing server 16.

When the delivery managing server 16 receives a streaming reproduction request for a content file from the user, the delivery managing server 16 causes the library managing server 12 to search for the content file.

The library managing server 12 searches the content library 11 for the desired content file. When the content library 11 stores the desired content file, the library managing server 12 transfers the content file to the user terminal unit 2 so that it can stream-reproduce the content file. At that point, the library managing server 12 searches the database (shown in FIG. 6) of the content library 11 for a non-skip area of the content file and, when such a non-skip area is found, transmits information from the non-skip area to the user terminal unit 2. The user terminal unit 2 stores the information from the non-skip area.

The user terminal unit 2 starts up a dedicated application for the streaming reproducing operation, receives the content file from the library managing server 12, and stream-reproduces the content file. Since the user terminal unit 2 has received the information from the non-skip area, the user terminal unit 2 can determine whether or not the currently reproduced information is from the non-skip area.

If the user operates a forward reproducing operation while the content file is being stream-reproduced, and the non-skip area is skipped, the application of the user terminal unit 2 causes information indicating that the non-skip area has been skipped (this information is referred to as non-skip area skip information) to be transmitted to the delivery managing server 16. The non-skip area skip information contains user information, file ID, non-skip area, and content creator information.

When the delivery managing server 16 receives the non-skip area skip information, the delivery managing server 16 issues a search command for a file corresponding to the non-skip area to the content creator information database 20.

The content creator information database 20 searches the database shown in FIG. 7 for a delivery file corresponding to the non-skip area of the content file.

When the content creator information database 20 has obtained a delivery file corresponding to the non-skip area of the content file, the content creator information database 20 sends the delivery file and the user information to the mail processing server 17.

The mail processing server 17 transmits the delivery file received from the content creator information database 20 to the user corresponding to the designated user information with electronic mail.

Thus, if a user has skipped a non-skip area, information corresponding to the non-skip area is nonetheless delivered to the user. When the non-skip area is a commercial, it is delivered to the user with electronic mail.

According to the present invention, when a content file is transmitted from a server to a user terminal unit, information of a non-skip area is also transmitted. The user terminal unit determines whether or not the non-skip area has been skipped. When the non-skip area has been skipped, information that indicates that the non-skip area has been skipped is transmitted to the server. When the server receives such information, information corresponding to the non-skip area is transmitted to the user terminal unit using another transmission means such as electronic mail. Thus, even if the important information is skipped on the user terminal unit, the information can be securely delivered to the user.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

We claim as our invention:

1. A content delivering method for transmitting a content file from a server managed by a content management company to a user terminal unit through a network, and for causing the user terminal unit to stream-produce the content file, the method comprising the steps of:

the content management company entering into a contract with a user to provide the user with the content file, including a designated skip area that represents an important portion to the content file that an information provider desires the user to view, and which designated non-skip area is managed and stored within a content library database, and wherein, upon execution of the contract, the content management company assigns a user ID and password to the user;

the user connecting the user terminal to the network;

the content management company transmitting means by which authentication can be performed via the assigned user ID and password, and wherein, upon authentication, the user is permitted to download the content file on a real-time streaming basis;

the content management company transmitting information of the non-skip area from the server to the user terminal unit along with the content file;

the data stream transmission causing the user terminal unit to determine whether or not the non-skip area has been skipped, wherein when a determination is made that the non-skip area has been skipped, the user unit transmits information indicating that the non-skip area has been skipped to the server at the content management company;

wherein when the server receives the information from the user terminal unit indicating that the non-skip area has been skipped, the server at the content management company transmits to the user terminal via email, information corresponding to the non-skip area;

wherein the content library comprises a content creator information database, which database stores information representing a file of information that is delivered to the user in the event that a non-skip area has been skipped; and wherein the non-skip information comprises user information, file ID, non-skip area and content creator information for each content information provider.

* * * * *